(12) United States Patent
Sinclair

(10) Patent No.: US 6,947,536 B2
(45) Date of Patent: Sep. 20, 2005

(54) INTERNATIONAL TELEPHONE ROUTING INFORMATION/STATUS NETWORK

(75) Inventor: Malcolm Sinclair, Gloucestershire (GB)

(73) Assignee: Data Information Systems Ltd., Gloucestershire (GB)

(*) Notice: Subject to any disclaimer, the term of this patent is extended or adjusted under 35 U.S.C. 154(b) by 0 days.

(21) Appl. No.: 10/351,439

(22) Filed: Jan. 27, 2003

(65) Prior Publication Data

US 2003/0138086 A1 Jul. 24, 2003

Related U.S. Application Data

(63) Continuation of application No. PCT/GB01/03309, filed on Jul. 24, 2001.

(51) Int. Cl.[7] .............................................. H04M 3/42
(52) U.S. Cl. .............................. 379/201.01; 379/207.04
(58) Field of Search ........................... 379/32.01–32.04, 379/142.17, 201.04, 201.01, 142.01, 207.02, 207.04–207.07

(56) References Cited

U.S. PATENT DOCUMENTS

| | | | | |
|---|---|---|---|---|
| 5,960,442 A | * | 9/1999 | Pickering | 707/104.1 |
| 5,999,965 A | * | 12/1999 | Kelly | 709/202 |
| 6,052,461 A | | 4/2000 | Lam | |
| 6,671,508 B1 | * | 12/2003 | Mitsuoka et al. | 455/412.1 |
| 2001/0044299 A1 | * | 11/2001 | Sandegren | 455/422 |
| 2003/0002642 A1 | * | 1/2003 | Jorasch et al. | 379/201.01 |

FOREIGN PATENT DOCUMENTS

| | | |
|---|---|---|
| GB | 2 311 908 A | 10/1997 |
| WO | WO 00/59151 | 10/2000 |

* cited by examiner

*Primary Examiner*—Benny Tieu
(74) *Attorney, Agent, or Firm*—Squire, Sanders & Dempsey L.L.P.

(57) ABSTRACT

A method of distributing telephone and/or telephone subscriber status/availability information comprises receiving information at a relay centre from each of a multiplicity of status/availability terminals. This information corresponds to the status/availability of a telephone and/or telephone subscriber and/or telephone line associated with the sending status/availability terminal. Information received at the relay centre from each sending status/availability terminal is immediately relayed to a group of other status/availability terminals associated with the sending terminal. At each receiving status/availability terminal, the received status/availability information is displayed on a display of the terminal to advise the subscriber of the current status/availability of other subscribers in which he is interested.

17 Claims, 1 Drawing Sheet

INTERNATIONAL TELEPHONE ROUTING INFORMATION/STATUS NETWORK

This is a Continuation of International Application No. PCT/GB01/03309 filed Jul. 24, 2001.

FIELD OF THE INVENTION

The present invention relates to an international telephone routing information/status/availability network (ITRISAN) and more particularly to a system which is capable of indicating to a telephone user in real time, or substantially real time, the status of a remote telephone or telephone line or of the user of that remote telephone/telephone line whether in the same building, another building, or anywhere in the world.

BACKGROUND TO THE INVENTION

It is readily apparent that a large number of telephone calls, both private and business, are wasted due to the unavailability of the called subscriber (where the term "subscriber" is taken here to mean a telephone user). For example, the called user may be absent from his normally used telephone, or he may be engaged in another conversation on the called telephone. It will also be apparent that a call relating to some relatively unimportant matter may lead to the interruption of an important meeting or the like.

A simple solution to this problem is to provide a human messaging service to take down a message and forward it to the called user, e.g. using an electronic or paper memo. The telecommunications industry has also implemented a number of solutions to deal with this problem. For example, a "call waiting" service has been introduced where, when a called user is engaged in an existing call, the new calling party is placed on hold and the called party is advised of the new incoming call by a tone or operator announcement. Another solution is the use of electronic telephone receptionists which intercept incoming calls, asking for the caller's name. The name is then relayed to the called party who can choose whether or not to take the call. Yet another solution is "call diversion", where a telephone user may, for example, cause incoming calls to be diverted from his fixed line phone to his mobile phone during an absence from the office.

A disadvantage associated with many solutions is that even a failed call involves the connection of the calling party to some telephone network node, e.g. an Intelligent Network (IN) node which diverts calls and/or plays operator announcements. This will typically incur a charge against the called and/or calling party's account and, often more importantly, will consume time on the part of the calling party and the called party especially if the called party needs to return the call, only to discover that the original calling party is now unavailable on the called telephone number. Establishing a call for only a very short duration may additionally be uneconomic for telephone network operators, as the cost charged for the call may not cover the (notional) set-up cost.

SUMMARY OF THE INVENTION

It is an object of the present invention to overcome or at least mitigate the above noted disadvantages.

This and other objects are achieved at least in part by providing telephone users with access to telephone status information distributed over a telephone status system. Aspects of the invention may enable telephone users to be allocated long term (possibly lifetime) ID codes which may be an alpha, alphanumeric, or numerical code.

According to a first aspect of the present invention there is provided a method of distributing telephone and/or telephone user and/or telephone line status information, the method comprising:

receiving information at one or more relay centres from each of a multiplicity of status terminals, said information corresponding to the status of a telephone and/or telephone user and/or telephone line associated with the sending status terminal;

immediately relaying the information received from each sending status terminal to a group of other status terminals associated with the sending terminal; and at each receiving status terminal, displaying the received status information or storing the information for later display.

Embodiments of the present invention allow a telephone user having a status terminal to determine whether or not a subsequent call made to a remote telephone user is likely to be successful. If he determines that a call is not likely to be successful, he can continue to monitor his status terminal until such time as the status of the remote telephone user indicates the availability of that user (the user may be alerted to the availability of the remote user by an audible alarm, flashing light, or other appropriate means). The key to the present invention is the provision of status information directly to telephone users in substantially real time.

The present invention can be used regardless of whether or not users are connected to the same PBX, PABX, or telephone network (PSTN, PLMN, etc).

The distributed information may comprise an indication of whether or not a telephone associated with a sending terminal is engaged. For example, a status terminal may send an off-hook notification to the relay centre to indicate that the associated telephone has become engaged. Correspondingly, the terminal may subsequently send an on-hook notification to indicate that the associated telephone is now available.

The distributed information may also comprise an indication of the current and/or future availability of the user normally associated with the telephone. The user may also enter other appropriate information into the terminal for sending to the relay centre(s).

A relay centre may maintain for each associated terminal a group of other terminals to which information received from the terminal is to be sent. That is to say that a group of terminals to be notified of status information may be selected from the entire set of users, with the selection being made by the users themselves. The group may be defined by sending terminal identifiers from the terminal for inclusion in the group. Alternatively, or in addition, a terminal may send its own identification to a relay centre for inclusion in the group associated with some other terminal. Both of these embodiments may require the provision of a password to the relay centre in order to modify the group held by a relay centre.

The distributed information (which will be referred to hereinafter as ITRISAN information) may be sent between the (ITRISAN) terminals and a relay centre using any suitable method including, but not limited to: the signalling network of a telephone network (either fixed line or mobile); a data transfer network of a telephone network; a paging network; a satellite communications network; a radio communications network; the Internet; or a cable network. The ITRISAN information may be sent using a combination of two or more different types of transmission networks. In the case of a fixed line telephone network, ITRISAN information may be sent using a signalling channel of an ISDN connection, e.g. using the D channel. In the case of a mobile telephone network, the ITRISAN information may be sent using a text message, e.g. an SMS message in GSM, or a network's data transmission facilities.

The information may be sent between the ITRISAN terminals and a relay centre via one or more intermediate relay centres. An ITRISAN may also comprise two or more relay centres, with individual ITRISAN terminals being allocated a given local relay centre.

The method may comprise printing the ITRISAN identification of a first user on business cards or other stationary of the user. Another user to whom such a card or piece of stationary is distributed may then add his own ITRISAN identification to the group of ITRISAN identifications associated at the relay centre with the first user.

In certain embodiments of the invention, the information may be modified or processed prior to relaying it to another ITRISAN terminal. For example, where the ITRISAN information comprises a time component, the component may be converted from the time zone of the sending terminal to the time zone of the receiving terminal.

In certain embodiments of the invention the method comprises receiving at the or each relay centre from user terminals, telephone numbers on which respective users are or will be available, and sending this information to respective groups of users, and displaying the received telephone number(s) at receiving terminals.

As well as making ITRISAN information available to users via an ITRISAN, information may be published on the Internet. Access to the published information may require a subscription or payment.

According to a second aspect of the present invention there is provided a status terminal for coupling to a status network and comprising:

a display;

user data input means;

signal input means arranged in use to receive from the status network information identifying the status of one or more remote telephones and/or telephone users and/or telephone lines;

first processing means coupled between said input means and said display for causing said received information to be displayed on the display;

signal output means coupled to the status network;

second processing means coupled between the user data input means and the signal output means and/or between a telephone of the user and the signal output means, and arranged in use to relay information input by the user identifying the status of the user and/or telephone status information received from the telephone, to the signal output means for subsequent sending over the status network.

The functionality of the terminal may be integrated into a telephone terminal, fixed line or mobile, or may be integrated into any suitable information display device or any suitable network information inputting device. Alternatively, the (ITRISAN) terminal may be a stand alone terminal which may be coupled to a user's telephone via a wire or wireless connection. In either case, the ITRISAN terminal may be a fixed line terminal or wireless terminal. The terminal may be a computer terminal incorporating the necessary functionality. The computer terminal may incorporate telephone functionality. The terminal may be a pager.

According to a third aspect of the present invention there is provided a status network arranged in use to distribute telephone and/or telephone user and/or telephone line status information, the network comprising:

a multiplicity of status terminals according to the above second aspect of the present invention; and at least one relay centre having means for receiving information from the status terminals, said information corresponding to the status of a telephone and/or telephone user and/or telephone line associated with the sending status terminal, memory means for storing for each status terminal a group of associated other status terminals, and transmission means for immediately relaying the information received from each sending status terminal to said group of other status terminals associated with the sending terminal.

The ITRISAN may use existing telecommunications network infrastructure to transport data to and from relay centres (i.e. the ITRISAN may be a virtual network). Alternatively, the ITRISAN may use a dedicated infrastructure, or may use a combination of existing and dedicated infrastructures.

Other aspects of the present invention include:

A method of allocating to an individual telephone user a long term (possibly lifetime) ID code which may be an alpha, alphanumeric, or numerical code. Such a long term ID code may also be allocated to a group of telephone users. A user may program his ID code into a (ITRISAN) terminal which he is using. This terminal may be the user's normal terminal or a terminal which he is using temporarily.

A method of providing real time information regarding routing information and status of telephone users or groups of users to whom ID codes have been allocated, and a method of publishing telephone numbers to which calls should be made either immediately or in the future.

DETAILED DESCRIPTION OF CERTAIN EMBODIMENTS

Figure 1:
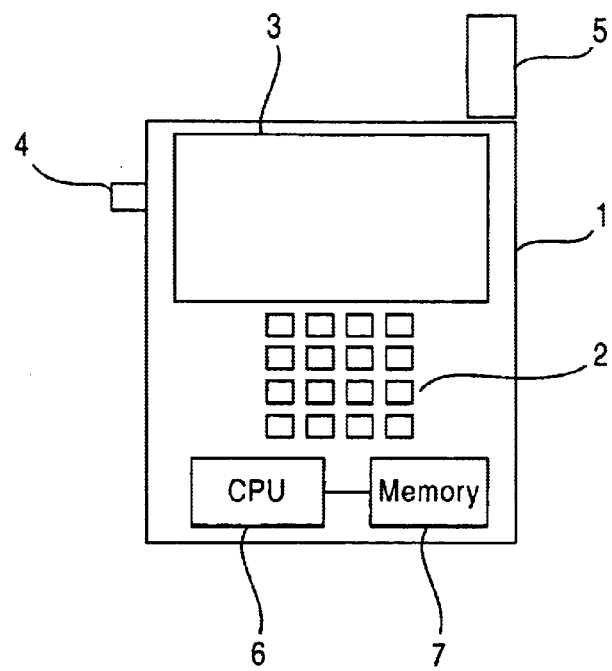
FIG. 1 illustrates schematically an ITRISAN terminal.

There is illustrated in FIG. 1 a stand alone Telephone Status Network terminal 1 (hereinafter referred to as an ITRISAN terminal) which comprises a keypad 2 and a liquid crystal display 3. The terminal 1 has a signal connector 4 arranged in use to be coupled to a telephone (not shown) via a fixed line or other means and a radio antenna 5 for transmitting signals between the terminal 1 and one or more orbiting satellites. The terminal 1 contains a central processing unit (CPU) 6 and a memory 7 coupled to the CPU.

Figure 2:
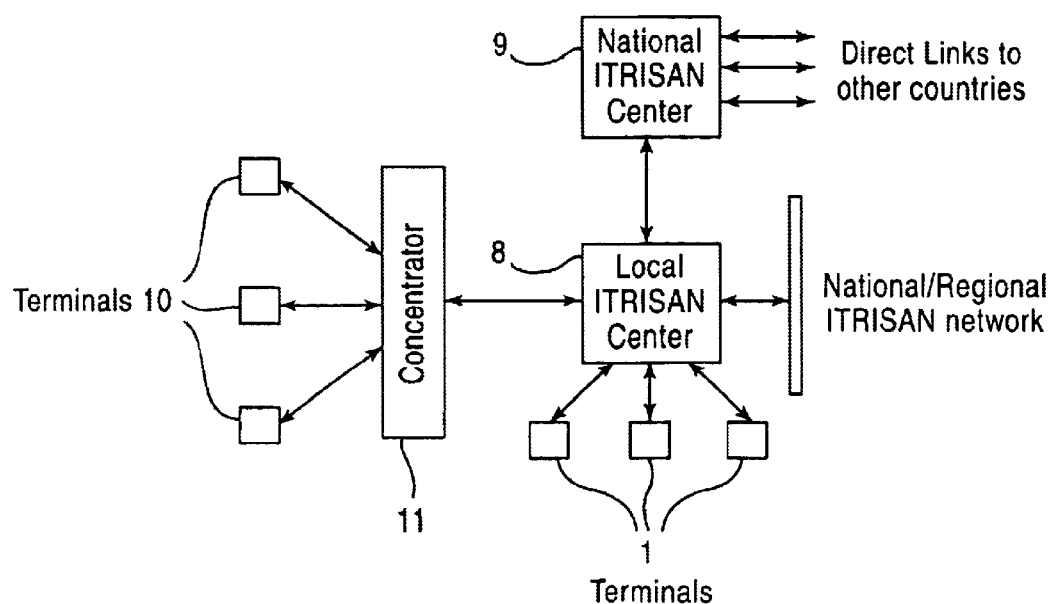
FIG. 2 illustrates schematically an ITRISAN.

FIG. 2 illustrates an "ITRISAN". The ITRISAN in general terms is a network which is able to multicast telephone and telephone user ITRISAN information from a given ITRISAN terminal 1 to other similar terminals. The ITRISAN comprises a number of information relay centres including a local ITRISAN centre 8 and a national ITRISAN centre 9. Each of the information relay centres 8,9 is coupled to the orbiting satellites via respective radio antenna (not shown). Alternatively the local ITRISAN centres 8 may be coupled to the satellite via a national ITRISAN centre 9. Data transmitted over the network may be encrypted to prevent unauthorised eavesdropping.

In addition to a multiplicity of stand alone ITRISAN terminals 1, FIG. 2 illustrates a set of terminals 10 which are connected to a concentrator 11. In this case, communications between the terminals 10 and the satellite are routed through the concentrator. Such an arrangement may suit a corporate user, as he will require only a single satellite link to serve many individual terminals 10. Every ITRISAN terminal is allocated an identification code (ID code) which is known to the terminal or its user as well as to the ITRISAN (in some cases a group of terminals are allocated a common ID code such as may be appropriate for terminals associated with telephones of a call centre).

It is noted that a user of an ITRISAN terminal, or a corporation employing a corporate ITRISAN, will pay a subscription to the operator of the ITRISAN to enable him to use the ITRISAN service (alternatively or additionally users may be billed based upon their use of the service). The ITRISAN operator may be the operator of a telephone network or he may be independent thereof.

Using the keyboard 2 of his terminal 1,10, or in certain embodiments the keypad of his telephone, a user is able to key into the terminal the ID codes of other ITRISAN terminals 1,10 which the user believes should receive ITRISAN information sent from his terminal. The entered ID codes are sent to the local ITRISAN centre 8 of the sending terminal where they are grouped together and associated with the ID code of the sending terminal, and stored in an electronic data memory of the local ITRISAN centre for uploading to a national or international centre as appropriate. The user of some other ITRISAN terminal 1,10 may additionally cause his terminal's ID code to be sent to the local ITRISAN centre 8 and added to that group. To do this, he would also need to send the ID code of the terminal to whose ID code group he wishes to be added. In order to disseminate the ID code of his terminal to other ITRISAN users, a user may have his ID code printed on his business cards and included on his personal or company letterhead paper. This will in practice restrict the number of people who have access to a particular user's status information.

The local ITRISAN centres 8 are able to send ITRISAN information between ITRISAN terminals 1,10 which are coupled to that same local centre 8. However, in order to send information between terminals not coupled to the same local centre 8, information must be routed through one or more national and/or international ITRISAN centres 9 and/or other local ITRISAN centres 8. The ITRISAN may regularly interrogate ITRISAN terminals to identify faults.

The operation of the ITRISAN is best illustrated by way of example. In a simple case, each ITRISAN terminal 1,10 receives on-hook and off-hook signals from the associated telephone. These signals are immediately sent to the respective local ITRISAN centres 8. The signals are accompanied by the ID code of the sending terminals 1,10, such that the local ITRISAN centre 8 is able to determine the ID codes of the terminals 1,10 which should receive the ITRISAN information. The information is relayed to these terminals 1,10 directly or via a national ITRISAN centre 9 and/or concentrator 11. A terminal 1,10 reacts to receipt of an ITRISAN message by displaying on its display 3 a message saying "USER XXX ENGAGED" or alternatively "USER XXX AVAILABLE ON NNNN NNNNNNN". In the event that the display 3 of the receiving terminal is switched off, the received information may be stored in the terminal's memory 7. If the memory 7 cannot be accessed (for example the terminal is switched off or is a mobile terminal and is out of range), the information may be stored at the local ITRISAN centre 8 of the receiving terminal 1,10 pending switching on of the terminal (or comes back into range if it is a mobile terminal).

The display of an ITRISAN terminal may be reset periodically to avoid it from becoming cluttered with old information. For example, at the start of each new day, the display may be cleared, and during that day information is only added as it is requested by the user.

The ITRISAN is not however limited to disseminating only a user's current telephone routing/status information. For example, a user may be able to advise his associated group of terminals (by the push of a button on his terminal) that he is leaving his office or home, or that he will be engaged in a meeting. He may also enter into the terminal the time (and date) when he will once again be available. Upon returning to his home or office (or at the end of the meeting), he may cancel the previous notification, again by the press of a button.

A further enhancement allows an ITRISAN terminal 1,10 to send to its local ITRISAN centre 8 a phone number on which the user using that terminal can be reached. This phone number may be the phone number of the telephone attached to the terminal 1,10 or may be some other telephone (e.g. a mobile telephone). The phone number may be sent together with the status change notification message and may be generated automatically, e.g. when the user presses a button to indicate that he is leaving the office, his mobile number may be sent to the local ITRISAN centre 8. When he returns to the office and presses the appropriate button, his office number is sent to the local ITRISAN centre 8. The telephone number data is disseminated to other terminals via the local ITRISAN centre 8 (and possibly via the national and international ITRISAN centres 9) to other ITRISAN terminals where it is displayed to interested users. Alternatively or additionally a user may have the option of manually entering a telephone number (on which he is available) into his ITRISAN terminal 1,10 for sending to other terminals.

Another enhancement provides for an autodial facility at ITRISAN terminals 1,10. A user may select a user from the list of users displayed on his terminal (e.g. using a scroll key) causing the number stored for that user (or the number on which the user is currently available) to be automatically dialled. A facility may also be provided for automatically calling a selected user when that user becomes available.

Yet another enhancement allows a user to the ITRISAN to group other users wishing to avail themselves of that user's ITRISAN information, into different levels. The ITRISAN is notified of the levels allocated to users. A user may allocate a small number of other users to a high priority level, more to a medium priority level, and the remainder to a low priority level. When the user is busy, he may notify the ITRISAN that only members of the high priority group are to be notified that the user is available. When he is less busy, he may notify the ITRISAN that members of the medium priority group (and possibly the low priority group) can also be notified that he is available.

In some cases, a large number of ITRISAN users may wish to know when some other user becomes available. Unless some action is taken, this may result in many users trying to make a call at the same time. This problem may be mitigated by notifying sub-groups of users sequentially when another user becomes available. The "available" notification will be displayed on the terminals of a first sub-group for a predefined time period, e.g. one minute. After that, the status is reset to unavailable, and the terminals of the next sub-group of users are notified that the other user is available, etc. Of course, individual users may be notified in turn (rather than by sub-group).

The embodiment of the present invention described above provides a significant benefit to a user who has two or more subscriptions (i.e. two or more registered ITRISAN terminals), one of which is allocated to a mobile device. If the mobile device is stolen and used by the thief, the true owner will be made aware of the fraudulent use by his being alerted on another terminal that the stolen mobile device is in use.

It will be appreciated by the person of skill in the art that various modifications may be made to the above described embodiment without departing from the scope of the present invention. For example, the ITRISAN may enable a user to receive and send ITRISAN information via more than one ITRISAN terminal. For example, a user may have a desktop terminal as well as a mobile ITRISAN terminal. An ITRISAN terminal may comprise a function which presents an alert to the user when the status/available of a given terminal or terminal user has changed. This may be an audible alert. In some cases, a group of terminals associated with a given ITRISAN terminal may be defined collectively by a corporate user.

It will be appreciated that whilst the present invention has been illustrated by describing a dedicated ITRISAN terminal, the functionality of such a terminal may be readily implemented in a computer workstation such as a desktop or laptop PC. The functionality may also be implemented in a palm computer or PDA. Such computer devices may be coupled to separate telephones or may themselves incorporate telephone functionality. It will also be appreciated that the invention is particularly suited to use with mobile telephones and other mobile communication devices, with the functionality of the ITRISAN terminal being integrated into the mobile device.

What is claimed is:

1. A method of distributing telephone user status information where users may each utilise a plurality of telephone terminals and are identified by unique user identifiers, the method comprising:

receiving information at a relay centre from each of a multiplicity of status terminals operated by users, said information corresponding to an on-hook/off-hook status of a telephone associated with a sending status terminal and including a sender's unique identifier;

at the relay centre, identifying the user associated with received status information based on the sender's identifier, accessing a database associated with the relay centre, the database storing for each user an identification of a group of associated other status terminals, and identifying that group of status terminals associated with the user for which status information has been received;

immediately relaying the information received from each sending status terminal to the identified group of status terminals; and at each receiving status terminal, displaying the received status information or storing the information for later display.

2. A method according to claim 1, wherein the status information comprises an indication of the current or future availability of the user of the associated telephone.

3. A method according to claim 1 and comprising sending status information between the status terminals and the relay centre using one or more of the following transport mechanisms: the signalling network of a telephone network (either fixed line or mobile); a data transfer network of a telephone network; a paging network; a satellite communications network; a radio communications network; the Internet; a data network; and a cable network.

4. A method according to claim 1 and comprising sending information between the status terminals and the relay centre via one or more intermediate relay centres.

5. A method according to claim 1 and comprising printing the user identifier of a first user on business cards or other stationary of the user and distributing these to other users.

6. A method according to claim 1 and comprising transporting said information via a dedicated network which is separate from the telephone network(s) used to carry telephone calls.

7. A method according to claim 1 and comprising transporting said information via a telecommunications network or telecommunications networks.

8. A method according to claim 7 and comprising transporting said information between telephone network switches.

9. A method according to claim 7 and comprising transporting said information across boundaries between telecommunications networks.

10. A method according to claim 1, wherein said status terminals are wireless terminals.

11. A method according to claim 1 and comprising sending a telephone number on which a user can be reached, from the user's terminal to said relay center, and relaying the contact telephone number to each of the group of other status terminals associated with the sending user.

12. A method according to claim 11, comprising associating a telephone number received at a status terminal with a user identity, and causing the telephone number to be automatically called when a user of the status terminal selects that user identitiy.

13. A status terminal for coupling to a status network and comprising:

a display;

user data input means;

signal input means arranged in use to receive from the status network information identifying the status of one or more remote telephone users, the receiving status terminal or its user previously having registered an interest in said remote user(s) with the network;

first processing means coupled between said input means and said display for causing said received information to be displayed on the display;

signal output means coupled to the status network; and second processing means coupled between the user data input means and the signal output means and between a telephone/telephone line of the user and the signal output means, and arranged in use to relay information input by the user, identifying the status of the user, and telephone on-hook/off-hook status information received from one of the telephone and telephone line, to the signal output means for subsequent sending over the status network, the terminal further comprising a memory for storing a user identifier, said second processing means being arranged to send said user identifier, together with the information input by the user and said on-hook/off-hook status information, to the signal output means.

14. A status terminal according to claim 13, wherein the status terminal is integrated into a telephone terminal.

15. A status terminal according to claim 14, wherein the status terminal is integrated into a wireless telephone terminal.

16. A status network arranged in use to distribute telephone and telephone user status information, the network comprising:

a multiplicity of status terminals for coupling to a status network, wherein at least one status terminal in the multiplicity of status terminals includes;

a display, user data input means, signal input means arranged in use to receive from the status network information identifying the status of one or more remote telephone users, the receiving status terminal or its user previously having registered an interest in said remote telephones users with the network, first processing means coupled between said input means and said display for causing said received information to be displayed on the display, signal output means coupled to the status network, and second processing means coupled between the user data input means and the signal output means and between a telephone/telephone line of the user and the signal output means, and arranged in use to relay information input by the user identifying the status of the user and telephone on-hook/off-hook status information received from the telephone, to the signal output means for subsequent sending over the status network, wherein the at least one status terminal is integrated into a telephone terminal;

each terminal further comprising a memory for storing a user identifier, said second processing means being arranged to send said user identifier, together with the information input by the user and said on-hook/off-hook status information, to the signal output means;

at least one relay centre having means for receiving information from the status terminals, said information corresponding to the status of a telephone and telephone user associated with the sending status terminal, memory means for storing for each status terminal or user a group of associated other status terminals, means for identifying the users of a sending status terminal on the basis of the accompanying user identifier, and transmission means for immediately relaying the information received from each sending status terminal to said group of other status terminals associated with the sending user.

17. A method of distributing telephone user status information, the method comprising:

allocating to each user a unique service identification code which may be used with one or more of a plurality of user terminals;

receiving group registration requests from users, each request being accompanied by a unique service identification, and registering each sending user with a group associated with the user identified by the sent unique service identification, the groups being stored at a database associated with a relay centre;

receiving information at said relay centre from each of a multiplicity of status terminals, said information corresponding to the status of a telephone user associated with the sending status terminal;

accessing said database and identifying that group of users associated with the user from whose status terminal the status information has been received;

immediately relaying the information received from each sending user to the status terminals of the identified group of users; and at each receiving status terminal, displaying the received status information or storing the information for later display.

* * * * *

UNITED STATES PATENT AND TRADEMARK OFFICE
CERTIFICATE OF CORRECTION

PATENT NO. : 6,947,536 B2 Page 1 of 1
DATED : September 20, 2005
INVENTOR(S) : Malcolm Sinclair It is certified that error appears in the above-identified patent and that said Letters Patent is hereby corrected as shown below:

<u>Title page,</u>
Item [30], Foreign Application Priority Data, should read:
-- July 28, 2000 (GB) 0018609.8 --.

Signed and Sealed this

Twenty-first Day of March, 2006

JON W. DUDAS
*Director of the United States Patent and Trademark Office*